(No Model.) 6 Sheets—Sheet 1.

A. F. & F. B. JOHNSON.
SECRET MESSAGE TELEGRAPH.

No. 253,060. Patented Jan. 31, 1882.

Witnesses:
William G. Clark
Jno. F. Gleason

Inventors:
Albert F. Johnson
Frank B. Johnson
By their atty
John S. Thornton

(No Model.)

A. F. & F. B. JOHNSON.
SECRET MESSAGE TELEGRAPH.

No. 253,060.

Patented Jan. 31, 1882.

Witnesses:
William G. Clark
Jno. J. Gleason

Inventors:
Albert F. Johnson.
Frank B. Johnson,
By their atty.
Wm S. Thornton (No Model.)

A. F. & F. B. JOHNSON.
SECRET MESSAGE TELEGRAPH.

No. 253,060. Patented Jan. 31, 1882.

Witnesses:

Inventors:
Albert F. Johnson &
Frank B. Johnson.
By their Atty.

(No Model.) 6 Sheets—Sheet 5.

A. F. & F. B. JOHNSON.
SECRET MESSAGE TELEGRAPH.

No. 253,060. Patented Jan. 31, 1882.

(No Model.)

A. F. & F. B. JOHNSON.
SECRET MESSAGE TELEGRAPH.

No. 253,060.  Patented Jan. 31, 1882.

Witnesses:
Jno. J. Eleason
A. Fred. Silverston

Inventors:
Albert F. Johnson,
Frank B. Johnson
By their atty
Jno. S. Thornton (No Model.)

A. F. & F. B. JOHNSON.
SECRET MESSAGE TELEGRAPH.

No. 253,060. Patented Jan. 31, 1882.

UNITED STATES PATENT OFFICE.

ALBERT F. JOHNSON AND FRANK B. JOHNSON, OF BROOKLYN, N. Y., ASSIGNORS TO THE JOHNSON MANUFACTURING COMPANY, OF SAME PLACE.

SECRET-MESSAGE TELEGRAPH.

SPECIFICATION forming part of Letters Patent No. 253,030, dated January 31, 1882.

Application filed August 16, 1881. (No model.)

*To all whom it may concern:*

Be it known that we, ALBERT F. JOHNSON and FRANK B. JOHNSON, citizens of the United States, residing in the city of Brooklyn, in the county of Kings and State of New York, have jointly invented an Improved System of Mechanism for Transmitting Secret Messages by Electro-Magnetic Telegraphs; and we hereby declare the following to be a full, clear, and exact description of our invention, reference being had to the accompanying drawings.

This invention consists in an improved system of mechanism for transmitting secret messages by means of electro-magnetic-telegraph instruments in such a manner that the contents or purport of the message cannot be ascertained by the telegraph-operator, but is disclosed only to the person who receives it or to whom it is addressed. By this system the message is received by the person to whom it is sent on a printed strip of paper sealed and addressed, so that practically it is a system for transmitting mail-matter by electric telegraph with the same speed that ordinary telegraphic dispatches are sent, and with the same privacy and secrecy as though it were sent through the mails in the ordinary manner of sending written messages or letters; and by our improved system two persons, although strangers to each other and thousands of miles distant from each other, can carry on and in a few minutes complete a correspondence which would require days or even weeks to accomplish by mail, while the persons who actually forward the said messages through the instruments and deliver the same are as completely ignorant of the nature or import of the messages as a mail-carrier is ignorant of the contents of a letter which he delivers; and, further, by this system the necessity for cipher-telegraphing, which is very expensive, both on account of the cost of the instruments and the high salaries of expert operators, is entirely obviated, inasmuch as the messages sent by our system are absolutely unintelligible to the operators who transmit them through the instruments and deliver them, unless the author of the message himself is the person who operates the instruments.

In carrying out this system of telegraphing we ordinarily use three special instruments or machines, which said machines are specifically described and their novel features claimed in the specifications marked respectively B and C, and filed simultaneously herewith; and the descriptions of the said machines in this specification are not extended further than is deemed necessary for understanding the several operations of the same in our improved system of telegraphing. By means of the first of these machines the message or dispatch is prepared for transmission; by the second it is transmitted to its destination over the ordinary telegraph-wires; and by the third it is received, printed, inclosed or sealed up, and addressed, ready for delivery to the person to whom it is sent; and for the sake of brevity we shall in this specification designate the first of these machines the "preparing-machine," the second the "transmitting-machine," and the third the "receiving-machine." But when the author of the message or communication himself sends the message through the instruments the second of these machines may be dispensed with by the use of a modified machine, which is similar in construction to the preparing-machine with certain parts of the transmitting-machine added thereto, all of which will be hereinafter particularly described and set forth.

By this system the message is received by the person to whom it is sent printed in the ordinary characters of the alphabet upon a strip of paper, which, before being taken from the receiving-instrument, is sealed up and addressed. Ordinarily we print the message on a single strip of paper placed in the receiving-machine, using in the latter suitable mechanism and devices for rolling the same as it is printed upon a short tube or quill, to which it is gummed, and gumming the end of the strip to the body of the roll after receiving the message before the roll is taken from the machine; but as a modification of this mode devices are employed for gumming a second strip of paper over the one which has been printed, and thereby dispensing with the use of the quill, all of which is hereinafter particularly set forth and described.

In the accompanying drawings, (on six sheets.)

Similar letters of reference indicate the same parts wherever they are found in any of said figures.

Figure 1:
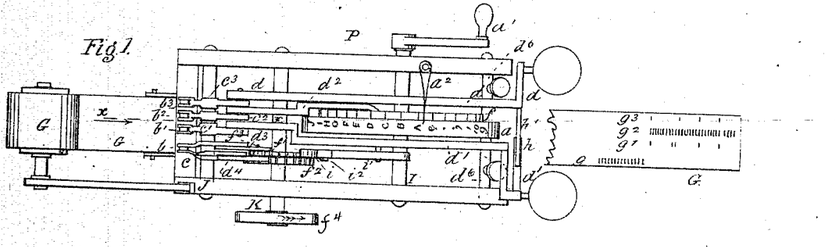
Figure 1 represents a plan view of the preparing-machine.
Figure 3:
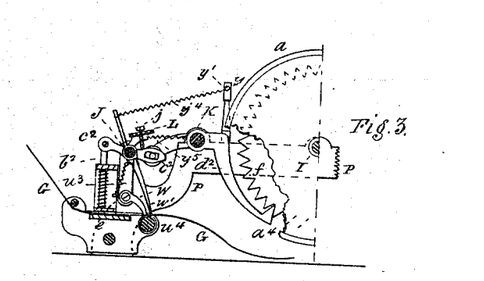
Fig. 3, a sectional view of the front end of the preparing-machine, showing the mechanism for making the indentations on the strip of paper.
Figure 12:
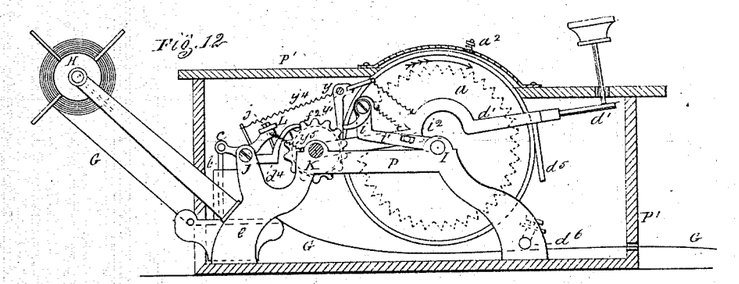
Fig. 12 is a side elevation of the preparing-machine.

To indent a message upon a paper strip the preparing-machine shown in Figs. 1, 3, and 12 is used, and it is so constructed that it can be operated by any person of ordinary intelligence, whether skilled in operating telegraph-instruments or ignorant of the art.

P represents the frame of the machine, and P' a case or cover, in which it is inclosed. This cover is not shown in Fig. 1.

G represents the strip of paper which is to receive the indentations, and which is held upon a reel or spool, H, and is passed from thence over a plate, $e$, at the front of the instrument, thence lengthwise through the case P', and out at an opening at the rear end of the same.

$a$ is a disk-wheel fixed upon a shaft, I, and turned by means of a crank, $a'$, upon the periphery of which are marked the letters of the alphabet, together with numerals up to 10 and the ordinary punctuation-characters.

Fixed upon the shaft I and rotating with the wheel $a$ is a toothed wheel, $f$, having teeth equal in number to the number of characters on the wheel $a$, each tooth being coincident with one of said characters. The said characters correspond in kind and number with those on the printing-wheel of the receiving-machine, and are placed in the same order.

$b\ b'\ b^2\ b^3$ are four upright rods, pivoted respectively at their upper ends to the ends of four arms, $c\ c'\ c^2\ c^3$, which latter are pivoted upon the bar or shaft J, while their lower ends, when they are depressed, form indentations upon the strip G, which is fed over the plate $e$ underneath them. These rods are depressed by means of the levers $d\ d'\ d^2$, which are fulcrumed upon the transverse bar or shaft K, (and by the levers $d^3$ and $d^4$, as will be presently explained,) and are lifted by suitable springs when the levers are raised, and each forms one of the lines of indentations $g\ g'\ g^2\ g^3$ upon the strip G as it is passed underneath them, and each line or series of indentations, when the strip G is passed through the transmitting-machine, operates automatically to bring into circuit one of the electro-magnets on the receiving-machine, as hereinafter described.

Figures 7, 8:
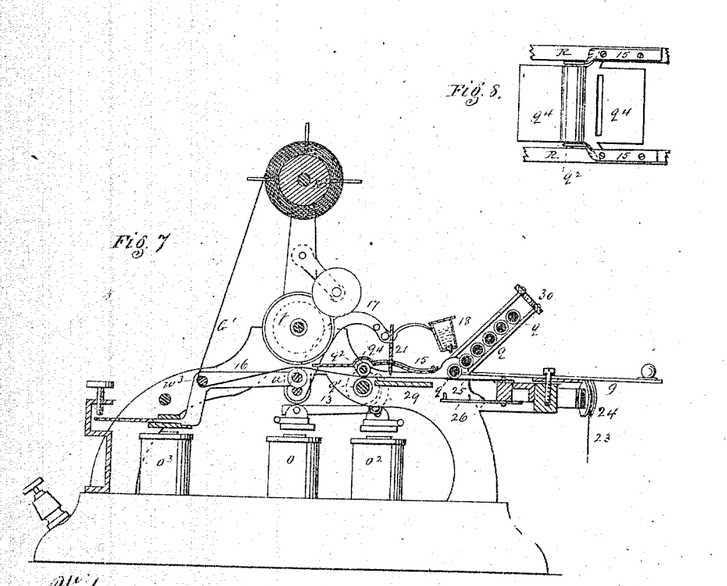
Fig. 7, a longitudinal section of the same, taken through the center.
Fig. 8, a plan of the device for concealing the printing in the same.
Figure 9:
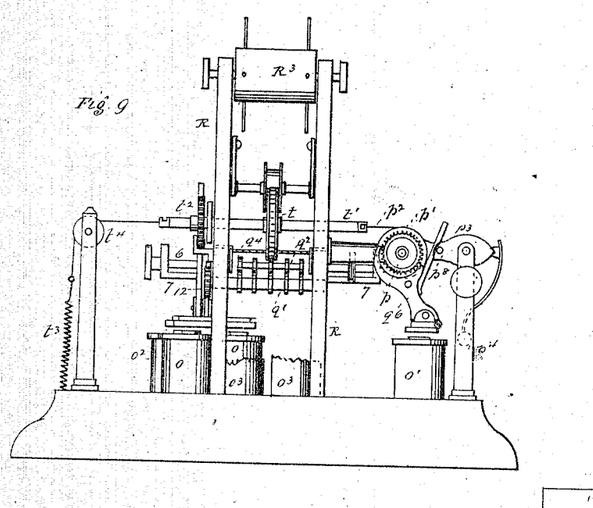
Fig. 9 is a partial end view of the receiving-machine, showing the mechanisms for effecting the transverse and rotary movements of its printing-wheel.

The operation in preparing a message is as follows: The letter-wheel $a$ is first set with the last of the series of characters thereon immediately under an index, $a^2$, secured to the top of the case P', over an opening in the latter, through which the said characters are seen as they successively pass underneath it. This being done, the wheel $a$ is turned by hand until the first letter in the message to be sent comes under the index $a^2$, and while it is being turned a pallet, $a^4$, at the rear and lower end of the lever $d^2$, engages with each of the teeth of the wheel $f$, whereby the front end of said lever is lifted, and it being pivoted to the rear end of the arm $c^2$, it depresses the rod $b^2$, and causes the latter to make one of the indentations $g^2$ as each tooth passes said pallet. These indentations $g^2$, when passed through the transmitting-machine, each bring into circuit the electro-magnet on the receiving-machine, whose armature rotates the printing-wheel $t$ in the latter, and thereby the said printing-wheel is made to rotate correspondingly with the wheel $a$. The characters or types on the wheel $t$, as before stated, correspond in kind and order to those on the wheel $a$, and when a message is to be received the last of the series of characters on the wheel $t$ is set immediately over the impressing-roller $u$, (see Fig. 7,) and consequently these indentations, by operating the magnet which rotates the printing-wheel, bring into position over the impressing-roller $u$ the same letter that had been brought under the index $a^2$, as above described. When the required letter has thus been brought under the index $a^2$ the outer or rear end of the lever $d$ is depressed once, and the front end of the said lever being pivoted to the rear end of the arm $c^3$, the rod $b^3$ is thereby depressed and makes one of the indentations $g^3$, which latter, when passed through the transmitting-machine, each bring into circuit the magnet on the receiving-machine, whose armature raises the impressing-roller $u$ against the printing-wheel $t$, and thereby prints that letter on the strip which is passed between said wheel and roller. A pin, $h$, is fixed on the lever $d'$, immediately under a similar pin, $h'$, on the lever $d$, by which means the lever $d'$ is depressed every time the lever $d$ is depressed, and the lever $d'$ being pivoted at its front end to the rear end of the arm $c'$, whenever it is depressed the rod $b'$ is caused to make one of the indentations $g'$, which latter, when passed through the transmitting-instrument, each brings into circuit the magnet on the receiving-machine, whose armature causes the transverse movement of the printing-wheel a letter-space at each pulsation, so that whenever the lever $d$ is depressed one of the indentations $g'$ is made simultaneously with one of the indentations $g^3$.

At each descent of the rod $b^2$ the strip G is moved forward by means of the mechanism most plainly shown in Fig. 3 and partly shown in Figs. 1 and 12, in which L is a reciprocating frame pivoted on the bar J, having two downwardly-projecting arms, $u^3$, one at each end. Pivoted at the lower end of each of the arms $u^3$ is a dog, $w$, the lower end of which rests upon the strip G as it passes over a roller, $u^4$, secured at the lower part of the front end of the frame P. On the upper part of the frame L, which extends transversely above the arms $c\ c'\ c^2\ c^3$, are provided set-screws $j$, the lower ends of which rest each upon the rear end of one of said arms, so that whenever the same is raised (and the front end of the same correspondingly depressed) the upper part of the frame L is also raised, and the lower ends of the arms $u^3$ are thrown backward, so that the dogs $w$ push the paper forward whenever an indentation is made thereon. The lower ends of the set-screws $j$ are kept in contact with the rear ends of the arms $c\ c'\ c^2\ c^3$ by a spring, $y^5$, extending from the frame L to some convenient point on the frame P. A second dog or drag, $w'$, which is pivoted on the bar J and kept with its lower end in contact with the strip G by means of a spring, $y^4$, holds the said strip while the dog $w$ is retracted.

The throw of the rods $b\ b'\ b^2$ is determined by rods $d^5$ on the rear ends of the levers $d\ d'$, which said rods come in contact with the heads of set-screws fixed in a bar, $d^6$, at the rear of the frame, so that deeper or shallower indentations may be made, as desired. After the first letter has been brought under the index $a^2$ and the rods $b'$ and $b^3$ have each made an indentation, as above described, the letter-wheel $a$ is again turned by hand until the next letter in the message is brought under the index $a^2$, and the lever $d$ is then again depressed, as before, making two other indentations, $g'$ and $g^3$, and a number of the indentations $g^2$ equal to the number of intervals or letter-spaces on the letter-wheel $a$, between the said two letters, and so on until the end of the first word is reached.

At the end of each word the lever $d'$ (which, it will be understood, moves independently of the lever $d$, as well as being moved by it) is depressed once by hand, whereby an additional indentation, $g'$, is made by the rod $b'$ for the purpose of moving the printing-wheel $t$ transversely, so as to leave a vacant space between words in the message when printed.

Figures 10, 11:
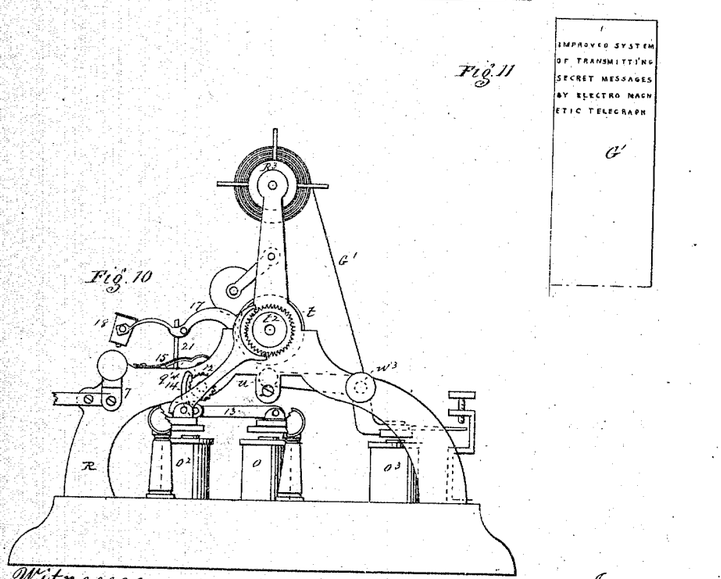
Fig. 10, an elevation showing the opposite side to Fig. 6.
Fig. 11, a portion of a printed message-strip, showing the arrangement of the printing thereon.

It will be seen from an inspection of Fig. 11, Sheet No. 4, that the message is printed by the receiving-machine, in consecutive lines, transversely across the paper, in page form, and the indentations $g'\ g^2\ g^3$, made as above described, operate respectively, when passed through the transmitting-machine, (through the medium of electric impulses,) to move the printing-wheel transversely a letter-space to rotate the same, so that it repeats the rotary movements of the letter-wheel $a$ while the indentations were being made, and to bring up the impressing-roller to print each letter of the message. The rod $b$ makes indentations $g$, which, when passed through the transmitting-machine, bring into circuit the electro-magnet on the receiving-machine, whose armature effects the longitudinal movement of the strip upon which the message is printed. This rod $b$ is operated by two separate mechanisms, one of which operates automatically to make indentations to effect the longitudinal movement of the strip in the receiving-machine whenever a line of printing is completed, and the other is operated by hand to make indentations, for the purpose of moving the said strip forward a sufficient distance between the message and the address, and also between the latter and the next message.

The first of these mechanisms consists of a toothed wheel, $f'$, (see Figs. 1 and 12,) having a number of teeth corresponding to the number of letter-spaces on each transverse line of printing on the strip in the receiving-instrument, which said wheel is racked around, one tooth at once, by each depression of the lever $d'$ through the medium of a pawl, $i$, pivoted at the end of an arm, $i'$, which latter is pivoted at its other end on the shaft I, and is moved by the lever $d'$ by means of a pin, $i^2$, fixed on the latter, which works in a slot in the arm $i'$, so that the wheel $f'$ is rotated the space of one tooth by each depression of said lever $d'$, and whenever the said wheel $f'$ has by this means been rotated one complete revolution a pin, $f^4$, fixed upon its side, lifts a lever, $d^3$, which is rigidly secured to the rear end of the arm $c$, thereby depressing the front end of said arm and causing the rod $b$ to make one of the indentations $g$. $y$ is an upright rod, pivoted at its upper end to the bar $y'$, the lower end of which rests on the periphery of the wheel $f'$ and prevents the pawl $i$ taking more than one of its teeth at each stroke.

The second of said mechanisms consists of the following parts: $f^2$ is a toothed wheel, which is turned by means of a crank or hand wheel, $f^4$, one complete revolution between the end of the message and the address, and again another revolution after the address has been indented. $d^4$ is a lever rigidly secured at one end to the rear end of the arm $c$, and provided at its other end with a click or pallet, which falls between the teeth of the wheel $f^2$, so that as each tooth of the said wheel passes the said click the rear end of the arm $c$ is lifted and its front end correspondingly depressed, thereby causing the rod $b$ to make one of the indentations $g$.

From the above description it will be understood that each indentation on these four separate lines of indentations, as it passes through the transmitting-machine, brings into circuit one of the electro-magnets on the receiving-machine through the medium of properly-arranged electric circuits and circuit-closers, and thereby the printing-wheel in the latter machine is caused to repeat the movements made by the letter-wheel $a$ while the message was being indented upon the strip G, and the message is printed upon the strip in said machine in transverse lines while it is being moved longitudinally through the same, and that any person of ordinary intelligence can prepare his own message on the machine above described. The message thus indented upon the strip G may then be transmitted to its destination. This is done by passing it through the transmitting-machine shown in Figs. 2 and 13. In passing it through the latter the surface which was undermost in the preparing-machine is now placed uppermost, so that the indentations form bosses which project upward from the surface of the paper. In said Figs. 2 and 13, $k$ represents a drum or cylinder, having bearings in suitable supports, $F^4$, and being provided with a roughened or friction surface on its periphery, over which the indented strip is passed.

Figure 2:
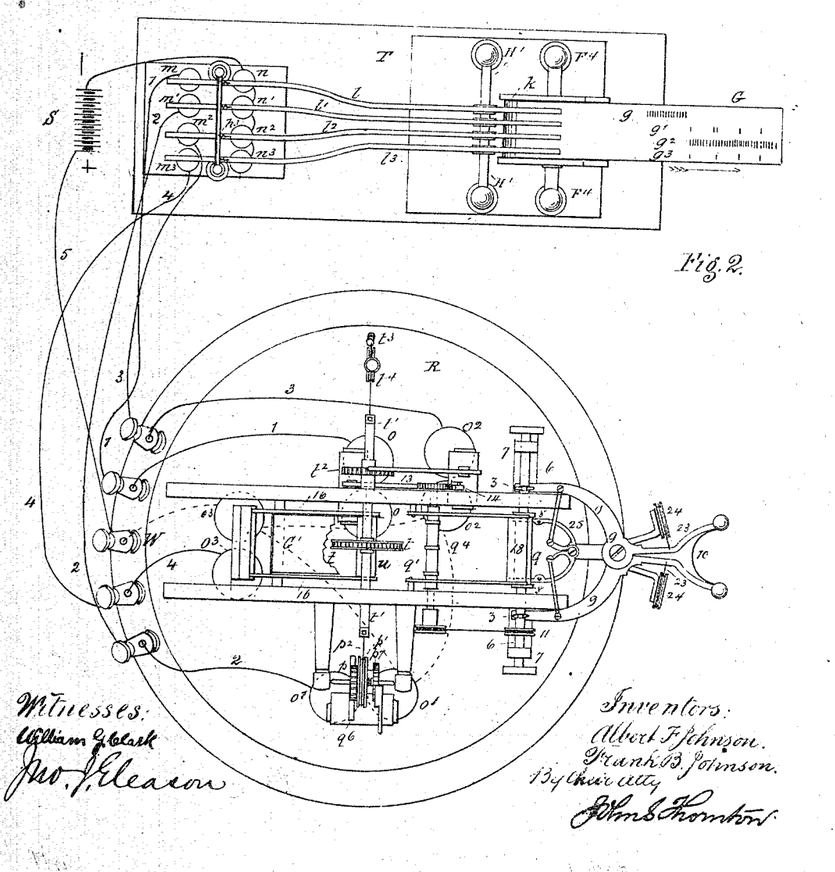
Fig. 2, a diagram showing the connections by wires between the transmitting-machine and the receiving-machine, and also representing a plan view of each of said machines with parts omitted.

$l$ $l'$ $l^2$ $l^3$ are a series of levers pivoted on a transverse bar, $H'$, to swing vertically, the upper ends of which are arranged so that one of the lines or series of indentations or bosses, $g$ $g'$ $g^2$ $g^3$, shall pass under each, and are provided with pins or projections on their under surfaces, which rest upon the strip G as it is passed over the drum $k$, and the lower ends of which, when depressed, each make contact with one pair of a double series of posts, $m$ $m'$ $m^2$ $m^3$ and $n$ $n'$ $n^2$ $n^3$. All these posts are insulated from the platform T, to which they are secured, and the series $m$ $m'$ $m^2$ $m^3$ are insulated from each other, and each connected by line-wires 1 2 3 4, respectively, with the magnets on the receiving-machine by means of ordinary telegraph-line wires extending from the sending-station to the receiving-station. The series $n$ $n'$ $n^2$ $n^3$ are connected with each other and with the negative pole of the battery S. In Fig. 2 a line-wire, 5, connects the positive pole of said battery with a binding-screw, W, on the receiving-machine, and thence connects with each magnet on the latter, as shown by the dotted lines in Fig. 2. The strip G is held upon a reel, $E^3$, and from thence is passed over the drum $k$, that surface of the same which was uppermost in the preparing-machine being placed upon the surface of the said drum, so that the indentations form bosses, as above mentioned, $g$ $g'$ $g^2$ $g^3$, which project upwardly from the surface of the paper and pass under the pins on the levers $l$ $l'$ $l^2$ $l^3$, respectively, thereby raising the upper ends of said levers and causing their lower ends to make contact with the posts $m$ $n$ $m'$ $n'$ $m^2$ $n^2$ $m^3$ $n^3$, respectively, and closing the circuits. The post $m$ is connected by wire 1 with the magnet $o$, which effects the longitudinal movement of the message-strip $G'$. $m'$ is connected by wire 2 with the magnet $o'$, that effects the transverse movement of the printing-wheel. $m^2$ is connected by wire 3 with the magnet $o^2$, that effects the rotary movement of the printing-wheel, and $m^3$ is connected by wire 4 with the magnet $o^3$, which operates the impressing-roller $u$. These several levers $l$ $l'$ $l^2$ $l^3$ therefore form circuit-closers, and whenever they make contact with their respective pairs of posts $m$ $n$ $m'$ $n'$ $m^2$ $n^2$ $m^3$ $n^3$ they bring into circuit the several magnets with which they are respectively connected, and thus by passing the indented strip G through the transmitting-machine the receiving-machine is automatically operated to receive and print the message indented thereupon in the preparing-machine.

$I^2$ and $I^3$ are friction-rollers for the purpose of pressing the strip snugly to the surface of the drum; $R'$, a curved plate to guide the same from the reel $E^3$ to the drum; and $h^3$ are springs attached to the lower ends of the levers, by which the latter are suspended to keep them from contact with the posts, except as they are brought in contact therewith by the bosses.

Figure 16:
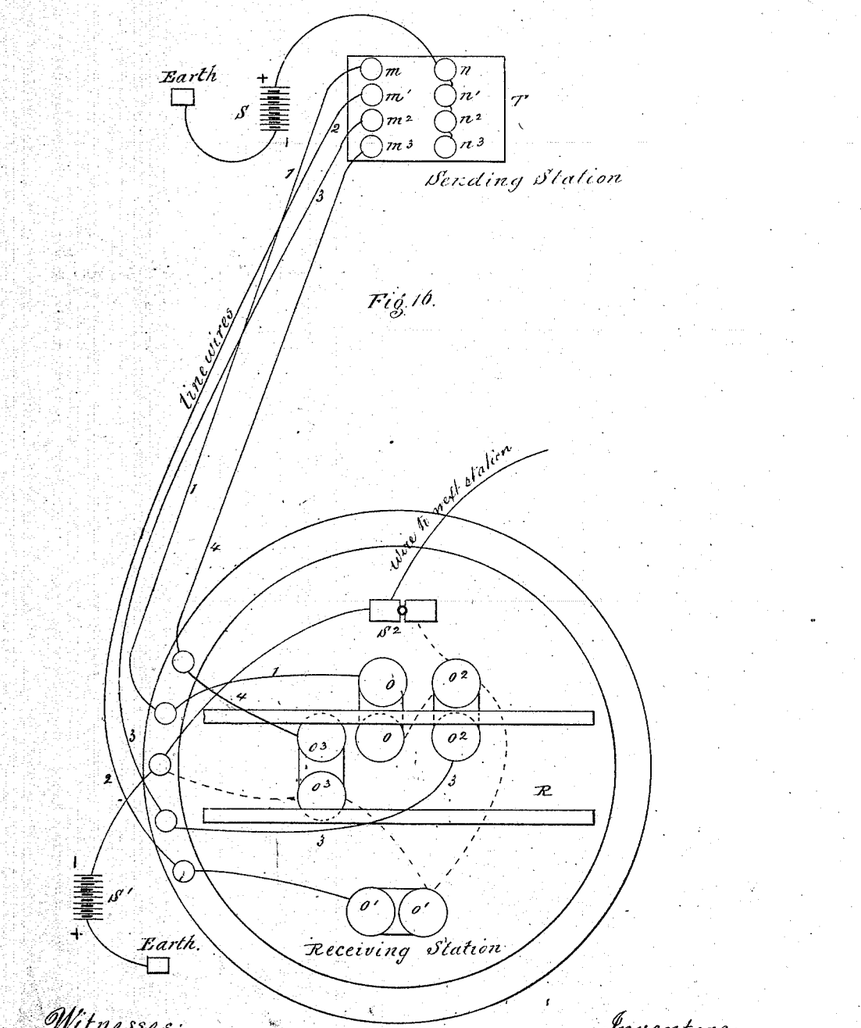
Fig. 16 is a diagram hereinafter explained.

The wire-connections above described are inserted to show the operations of the transmitting and receiving instruments, and are applicable when the instruments are near each other and ground-wires are not used. On Sheet No. 6, Fig. 16, is a diagram showing the arrangement of the circuits in the practical working of our system.

$S'$ represents the battery at the receiving-station, and $S^2$ an ordinary switch, which latter is put into operation when the message is to be received and printed at some other or more distant station. We do not claim any special devices for changing the directions of the currents, but employ any of the well-known means suitable for the purpose, together with necessary relays and other appliances, which are well known and in common use. The dotted lines represent wires connecting the magnets with battery $S'$ and switch $S^2$.

Figure 14:
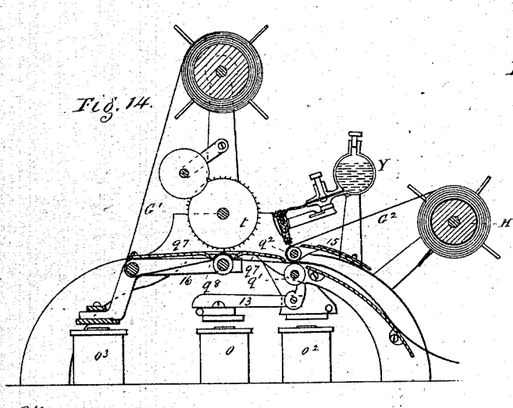
Fig. 14, a sectional view of the receiving-machine modified, as above mentioned, to gum a second strip of paper over the printed strip; and in Fig. 15 is shown a portion of a message-strip produced by the last-mentioned modification.

The receiving-machine is shown in Figs. 2, 6, 7, 8, 9, 10, and a modification thereof in Fig. 14.

Figure 15:
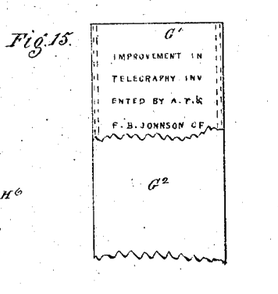

$t$ is the printing-wheel, having characters or printing-types corresponding to those on the letter-wheel $a$, as before stated. It is fixed upon a shaft, $t'$, and has both a rotary movement and also a transverse movement. Its rotary movement is effected by the pulsations of the armature of the electro-magnet $o^2$, which operates a pallet pivoted to said armature, that rotates a toothed wheel, $t^2$, fixed upon the shaft $t'$, said wheel having teeth corresponding in number to the number of characters on the printing-wheel $t$ and on the letter-wheel $a$; and it is moved transversely a letter-space each time a letter is printed, and a similar space in addition at the end of each word, by means of a pallet pivoted to the armature of the magnet $o'$, which rotates a toothed wheel, $p$, one tooth at each stroke of said armature, the wheel $p$ being fixed upon the same shaft as is a pulley, $p'$, to which latter one end of a cord, $p^2$, is attached, the other end of said cord being attached to the end of the shaft $t'$; and to the other end of said shaft $t'$ a cord is attached, which passes over a pulley, $t^4$, and is then attached to a spring, $t^3$, which latter retracts the shaft $t'$ whenever the printing-wheel has reached the end of a line. The shaft $t'$ slides in its bearings, carrying the printing-wheel to and fro across the frame of the machine, and at each of its ends is provided with a swivel, so that the shaft can rotate without twisting the cords attached thereto. It will be understood that this transverse movement of the printing-wheel is for the purpose of forming proper spaces or intervals between the letters in each word and between the words in the transverse lines of printing on the message-strip $G'$, as shown in Figs. 11 and 15, and that suitable devices are employed to release the pulley $p'$ whenever the printing-wheel has reached the end of each line of printing, so that it can be run back by the action of the spring $t^3$ to commence another line. Any suitable devices may be employed for this purpose, and in Figs. 9 and 6 we have shown one mode in which it may be effected, which is as follows: Upon the same shaft as the pulley $p'$ and wheel $p$ is secured a toothed wheel, $p^7$; and a lever, $p^3$, which is pivoted near its rear end to an upright post, $p^4$, is provided at its front end with a pawl, that engages with the teeth of the wheel $p^7$ and holds the said wheel, as well as the wheel $p$ and pulley $p'$, while the pawl $q^6$, which is pivoted to the armature of the magnet $o'$, rotates the wheel $p$. These wheels $p$ and $p^7$ and pulley $p'$ make only about half-revolutions, the wheel $p$ having about twice the number of teeth that there are letter-spaces in each line of printing; and whenever the printing-wheel has been moved transversely to the extreme end of a line, as above described, a pin fixed upon the pulley $p'$ or upon the wheel $p$ strikes a pin, $p^5$, secured upon the lever $p^3$, and releases both said wheels $p$ and $p^7$, and permits the spring $t^3$ to draw back the shaft $t'$, and the printing-wheel is thus drawn back across the frame into position to commence another line of printing; but any equivalent devices to those described may be employed to release the shaft $t'$ and permit the printing-wheel to be retracted at the end of each line.

The strip G, upon which the message is to be printed, is wound upon a reel, $R^2$, journaled at the upper part of the frame R, and its end is then passed over a bar or shaft, $w^2$, and between the printing-wheel $t$ and impressing-roller $u$, and thence between a pair of feed-rollers, $q'$ and $q^2$, and thence to a quill or short tube, $q$, to which latter it is gummed, and upon which it is wound as the printing of the message proceeds. The feed-rollers $q'$ $q^2$ are rotated by the armature of the magnet $o$ through the medium of a lever, 13, which is pivoted at one end to the said armature, and provided at its other end with a pawl, 14, that engages with the teeth of a wheel, 12, fixed upon the end of the lower roller, $q'$, and rotates said wheel one tooth at each stroke of said armature. The upper roller, $q^2$, is journaled at each end to a pair of spring-arms, 15, one of which is secured to each side of the frame R, and which produce a sufficient degree of friction between the rollers to insure the strip being fed forward with regularity the space between lines of printing at each stroke of said armature. The quill $q$ is inserted between the two inner ends of a divided shaft, 6, having bearings in the arms 7, and is held by the pressure of flanges 8 8, provided at the said ends of said shaft, so that it rotates with them. This pressure is effected by means of a pair of curved arms, 9, pivoted to the frame, as shown in Fig. 2, the inner ends of which are pressed toward each other by the force of a spring, 10, inserted between their outer ends, and are each provided with a small longitudinal ridge or rib, which fits into and under a shallow transverse groove formed in each portion of the shaft 6, as shown at 3, so that when the inner ends of the arms 9 are pressed toward each other the flanges 8 8 are correspondingly pressed against the ends of the quill $q$, and thereby sufficient friction is produced to insure the quill being rotated with regularity. The shaft 6 is rotated by means of a pulley, 11, secured upon one portion thereof, which said pulley is driven by a corresponding pulley on the end of the lower roller, $q'$, by means of a band which is sufficiently slack to slip on the pulleys when the circumference of the roll on the quill increases, so that the action of the feed-rollers shall not be affected by the increasing bulk of the roll on the quill. The impressing-roller $u$ is secured to the end of a pivoted frame, 16, the other end of which is attached to the armature of the magnet $o^2$, and it is raised by each stroke of said armature so as to press the strip G against the printing-wheel $t$.

That portion of the strip G that extends between the printing-wheel $t$ and the quill $q$ is entirely hidden from view by means of a plate or shield, $q^4$, (shown most plainly in Figs. 7, 8, and 9,) which extends across the frame R and between the printing-wheel and the quill above the strip, and which is riveted at its sides to the spring-arms 15, so that a person watching the movements of the instrument cannot see the characters that have been printed on the strip, and this shield $q^4$ cannot be removed without also removing the upper feed roll $q^2$, (being riveted to it,) and consequently the instrument will not operate to print a message unless the said shield is in place. A second plate, 29, is secured to the frame underneath the shield $q^4$, over which plate the strip travels.

Figure 6:
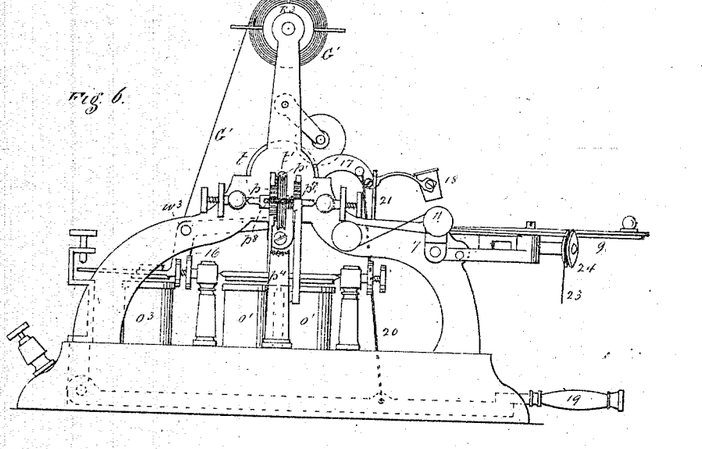
Fig. 6, a side elevation of the receiving-machine.

17 is a pivoted frame, to the outer end of which is secured a cup containing mucilage, directly over the quill $q$. Before printing a message this cup 18 is made to deposit a line of mucilage upon the quill to seal the end of the strip to the quill when it is fed forward, the said cup being brought in contact with the quill by means of a hand-lever, 19, and rod 20, the latter being attached at one end to the frame 17 and at its other end to the said lever, as shown in Fig. 6. After the subject-matter of the message has been printed the cup 18 is brought down by the lever and deposits a line of mucilage upon the roll on the quill, between the message and the address. The address is then printed after the strip has been fed forward a sufficient space, and then a third and longer stroke of the lever 19 is made, which longer stroke brings the cutting-edge of a knife, 21, secured in the frame 17, down upon the strip as it lies upon the plate 29, and cuts off the portion containing the dispatch. The printed message thus rolled upon the quill and sealed may then be taken from the instrument and delivered to the person to whom it is addressed. To take it from the instrument the inner ends of the arms 9 are spread apart to remove the pressure of the flanges 8 8 from the quill, and the latter then drops therefrom. The said arms 9 may be thus spread apart by means of cords 23 23, attached one to each arm, which, after being carried over pulleys 24 24, pivoted to arms secured to and extending from the frame R, may be connected and carried to any convenient point, and the requisite force applied thereto by a lever or other means to overcome the force of the spring 10 whenever the dispatch or roll is to be removed. Pivoted to the arms 9, and operated thereby, are two other pairs of arms, 25 and 26, the one pair located immediately above the other, the inner ends of each of which extend underneath the quill $q$. The upper pair, 25, is pivoted to move in the same directions as the arms 9 simultaneously therewith, and are for the purpose of supporting the quill $q$ while it is being clamped by the arms 9, and they also press against the under side of the roll upon the quill and assist in its being rolled smoothly upon the quill. The lower pair, 26, move simultaneously with the former, but in the opposite directions, and catch the quill as it falls, and hold the same so that it forms a support for the succeeding quill until it is clamped by the flanges 8 8. The quills successively fall into position from a rack or hopper, 30, (see Fig. 7,) secured to the frame of the machine.

From the above description it will be understood that the message is printed in ordinary alphabetical characters, in consecutive lines running transversely across the strip G, while the latter is fed longitudinally through the instrument; also, that the strip G, after receiving the impressions of the printing-wheel, is entirely hidden from view until it is rolled upon the quill, and also that the dispatch is sealed up before it is taken from the instrument.

The several armatures of the magnets are arranged in relation thereto in the ordinary manner, and are provided with the usual check-screws and retracting-springs, which do not demand special mention. These subsidiary parts are omitted in several of the figures in order to avoid crowding the drawings, and the proper positions of the same will be readily apparent to any one skilled in the art; and with the same end in view parts of the mechanism, in most of the figures, are omitted; but a reference to the figures in which they are shown will readily suggest their proper locations and respective positions.

Figure 4:
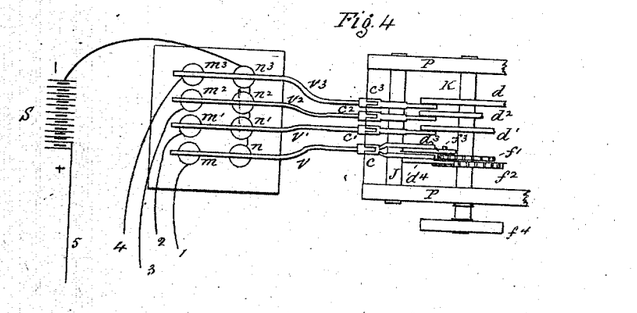
Fig. 4 is a plan view of the mechanism for transmitting a message without the use of the indented paper strip.
Figure 5:
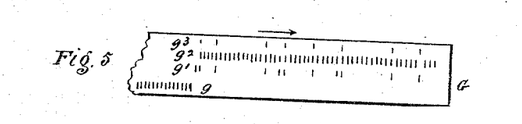
Fig. 5, a plan view of a portion of the strip containing indentations.
Figure 13:
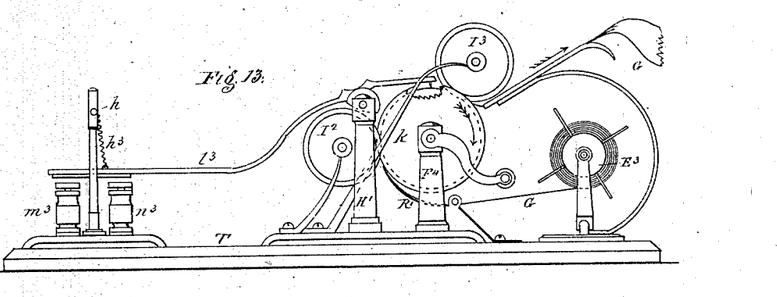
Fig. 13, a side elevation of the transmitting-machine.

In Fig. 4 is shown a plan view of the modification above mentioned, by means of which the indented strip G is dispensed with. In this figure only the front end of the preparing-machine is shown; but it will be understood that all the parts thereof, as shown in Figs. 1, 3, and 12, are used, excepting only the rods $b$ $b'$ $b^2$ $b^3$, the reel H, and the devices for feeding the strip G, which latter is dispensed with. The transmitting-machine shown in Figs. 2 and 13 is also dispensed with, excepting the posts $m$ $m'$ $m^2$ $m^3$ and $n$ $n'$ $n^2$ $n^3$, which in this modification are used in connection with the remaining parts of the preparing-machine, as above mentioned, and are connected with the battery S and the receiving-machine in the same manner as previously described; and to the arms $c$ $c'$ $c^2$ $c^3$ are respectively connected insulated wire rods $v$ $v'$ $v^2$ $v^3$, extending from the front ends of said arms over the said posts, with which latter they make contact in the same manner as the levers $l$ $l'$ $l^2$ $l^3$, previously described, and thereby bring the several magnets on the receiving-machine into circuit. The preparing-machine thus modified becomes the transmitting-instrument, and is manipulated to transmit a message in precisely the same manner to operate the receiving-machine that it was in the former case manipulated to prepare the strip G by indenting the message thereon.

In Fig. 14 is shown a modification, whereby the message-strip is covered with a second strip of paper while in the machine, so as to hide the printing thereon. The said figure represents a longitudinal section of the receiving-machine provided with devices for applying and sealing the second strip of paper. $q'$ and $q^2$ represent the feed-rollers, which are placed in the same position and rotated in the same manner as before described to feed the strip G through the machine. H⁶ is a reel or spool, upon which a second strip of paper, G², is placed, which latter is carried over the upper feed-roller and between the upper and lower feed-rollers, as shown, where it joins the strip G'. In this case the message-strip G' is previously gummed at its edges, as shown by the dotted lines in Fig. 15. A cup or fountain, Y, containing water, is located above the frame of the machine and arranged to dampen the edges of the strip G² as it passes over the upper feed-roller, so that the gummed edges of the strip G' and the dampened edges of the strip G² come together and adhere as the two strips pass between the feed-rollers, and the printing is thus hidden and sealed between the two strips and passes from the instrument sealed, as shown at the right of the figure. A plate, $q^7$, is secured at one end to the frame 16, its other end extending under the printing-wheel and above the strip G to the feed-rollers, thereby hiding the printing on said strip while it is traveling from the printing-wheel to the said rollers. At that part of the plate $q^7$ which is immediately under the printing-wheel $t$ and over the impressing-roller $w$ is an opening in the same to permit the strip to come in contact with the printing-wheel, and the edges of this opening are turned down, as shown at $q^8$, so as to press upon the strip as it passes over the impressing-roller and keep it snugly upon the same. In this modification the quill and the devices for operating it are of course omitted.

In our improved system we prefer to print the message on the strip G in transverse lines, as above described, and as shown in Figs. 11 and 15; but, if preferred, the message may be printed in one straight line, in which case the devices and mechanisms for operating the transverse feed of the printing-wheel will not be used, but all the remaining parts will be used, as before described.

From the above description it will be readily apparent that the purport of the dispatch is not known or ascertained by any one, except the author of the same and the person to whom it is sent, whether sent by the use of the prepared strip or sent direct, as above set forth; and it will also be apparent that the indentations or impressions may be of any suitable form to automatically operate the transmitting-instrument, the object being to impress the message upon the strip in a form which, although unintelligible upon inspection, will through the medium of the transmitter and the electric circuits operate the receiving-instrument and cause it to receive and print the message in alphabetical or typographical characters.

What we claim as our invention is—

The system of mechanism herein described for automatically transmitting secret telegraphic dispatches, consisting of, first, a preparing-machine for impressing the message in unintelligible characters upon a strip of paper, G, said machine consisting of a series of impressing-rods, $b, b', b^2, b^3$, operated by levers $d\ d'\ d^2\ d^3\ d^4$, in connection with a letter wheel, $a$, to produce three or more separate series of indentations, $g\ g'\ g^2\ g^3$, upon said strip G, and a feeding device, constructed as described, to feed forward said strip while the indentations are being made; secondly, a transmitting-machine consisting of a drum, $k$, over which said strip is passed, and a series of levers or circuit-closers, $l\ l'\ l^2\ l^3$, operated automatically by said indentations $g\ g'\ g^2\ g^3$, respectively, for the purpose of opening and closing electric circuits with the receiving-machine through the medium of line-wires and batteries forming properly-arranged electric circuits, as described; and, thirdly, a receiving-machine on which the message is printed in alphabetical characters, having a series of magnets, $o\ o'\ o^2\ o^3$, which are brought into circuit by means of the indentations $g\ g'\ g^2\ g^3$, respectively, and which operate the printing-wheel $t$ and message-strip G' through the medium of the mechanism connected with each of them, as shown and described, the said receiving-machine being also provided with devices for concealing the message while it is being printed and devices for sealing the same, as described, the whole being constructed to operate as set forth.

ALBERT F. JOHNSON.
FRANK B. JOHNSON.

Witnesses:
JOHN S. THORNTON,
J. OGDEN SMITH.